US012207386B2

(12) United States Patent
Yokoyama

(10) Patent No.: US 12,207,386 B2
(45) Date of Patent: Jan. 21, 2025

(54) ELECTROMAGNETIC FIELD CONTROL MEMBER

(71) Applicant: KYOCERA Corporation, Kyoto (JP)

(72) Inventor: Atsushi Yokoyama, Shiga (JP)

(73) Assignee: KYOCERA CORPORATION, Kyoto (JP)

( * ) Notice: Subject to any disclaimer, the term of this patent is extended or adjusted under 35 U.S.C. 154(b) by 345 days.

(21) Appl. No.: 17/638,747

(22) PCT Filed: Aug. 28, 2020

(86) PCT No.: PCT/JP2020/032738
§ 371 (c)(1),
(2) Date: Feb. 25, 2022

(87) PCT Pub. No.: WO2021/040016
PCT Pub. Date: Mar. 4, 2021

(65) Prior Publication Data

US 2022/0338339 A1 Oct. 20, 2022

(30) Foreign Application Priority Data

Aug. 29, 2019 (JP) ................................ 2019-157327

(51) Int. Cl.
*G21K 1/093* (2006.01)
*H05H 7/04* (2006.01)

(52) U.S. Cl.
CPC ............... *H05H 7/04* (2013.01); *G21K 1/093* (2013.01); *H05H 2007/046* (2013.01)

(58) Field of Classification Search
CPC ..... H05H 7/04; H05H 2007/046; G21K 1/093
See application file for complete search history.

(56) References Cited

U.S. PATENT DOCUMENTS

2020/0105433 A1 4/2020 Iwamoto et al.

FOREIGN PATENT DOCUMENTS

JP 11-283795 A 10/1999
WO 2018/174298 A1 9/2018

OTHER PUBLICATIONS

Mitsuda et al., Beam Performance Test of Ceramics Chamber With Integrated Pulsed Magnet in Beam Transport-Dump for KEK PF-Ring. Proceedings of the 16th Annual Meeting of Particle Accelerator Society of Japan, Jul. 31-Aug. 3, 2019, 5 pgs, Abstract Only.

*Primary Examiner* — David E Smith
*Assistant Examiner* — Christopher J Gassen
(74) *Attorney, Agent, or Firm* — Procopio, Cory, Hargreaves & Savitch LLP

(57) ABSTRACT

Provided is an electromagnetic field control member including a first insulating member that is made of a ceramic having a tubular shape and includes a plurality of through holes extending in an axial direction; a conductive member made of a metal, the conductive member sealing off each of the through holes and leaving an opening portion in the through hole, the opening portion opening to an outer periphery of the first insulating member; a power feed terminal connected to the conductive member; and flanges respectively located at two ends of the first insulating member. A second insulating member made of a ceramic having a tubular shape is disposed on an outer peripheral side of the first insulating member, and includes two ends that are hermetically fixed to the flanges, respectively.

14 Claims, 4 Drawing Sheets

ELECTROMAGNETIC FIELD CONTROL MEMBER

TECHNICAL FIELD

The present disclosure relates to an electromagnetic field control member, the member being used in accelerators or the like for accelerating charged particles such as electrons and heavy particles.

BACKGROUND ART

In the related art, there has been a demand for high speed, high magnetic field power, and high repeatability with regard to an electromagnetic field control member that is used in accelerators for accelerating charged particles such as electrons and heavy particles. For such improvements in performance, Ceramics Chamber with integrated Pulsed-Magnet (hereinafter referred to as CCiPM) has been proposed by Chikaori Mitsuda et al. of the High Energy Accelerator Research Organization (Non Patent Document 1).

CCiPM includes an insulating member having a cylindrical shape, the insulating member being made of a ceramic; a through hole formed along an axial direction of the insulating member, the through hole extending through a thickness direction of the insulating member; and a coil having a substrate shape, the coil being embedded in the through hole. The coil serves as a part of a partition wall that separates the inside and outside of the insulating member, and ensures airtightness inside the insulating member.

CITATION LIST

Non Patent Literature

Non Patent Document 1: Chikari Mitsuda et al., "Beam performance test of Ceramics Chamber with integrated Pulsed Magnet in beam transport-dump line for KEK PF-ring"

SUMMARY OF INVENTION

An electromagnetic field control member according to an embodiment of the present disclosure includes a first insulating member made of a ceramic having a tubular shape, the first insulating member having a plurality of through holes extending in an axial direction; a conductive member made of a metal, the conductive member sealing off each of the through holes and leaving an opening portion in the through hole, the opening portion opening to an outer periphery of the first insulating member; a power feed terminal connected to the conductive member; and flanges respectively located at two ends of the first insulating member. A second insulating member made of a ceramic having a tubular shape is disposed on an outer peripheral side of the first insulating member, and includes two ends that are hermetically fixed to the flanges, respectively.

DESCRIPTION OF EMBODIMENTS

An electromagnetic field control member according to an embodiment of the present disclosure will be described below with reference to the drawings. In the present example, an example of a ceramic chamber with an integrated pulsed magnet (CCiPM) is described as an embodiment of the electromagnetic field control member.

Figure 1A:
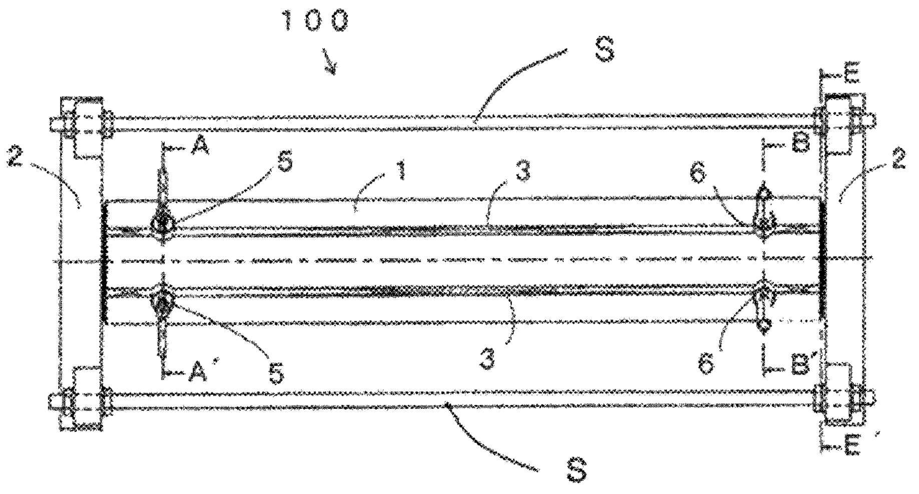
FIG. 1A is a front view illustrating an electromagnetic field control member according to an embodiment of the present disclosure.

FIG. 1A illustrates an electromagnetic field control member 100 according to an embodiment of the present disclosure, which is a CCiPM. The electromagnetic field control member 100 illustrated in FIG. 1 includes an insulating member 1, and flanges 2, 2 respectively located at two ends of the insulating member.

Figure 1B:
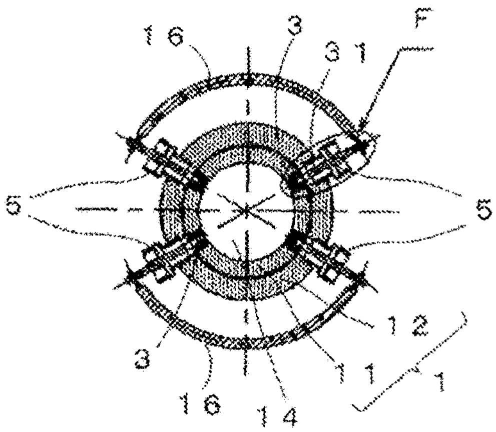
FIG. 1B is a cross-sectional view taken along line A-A' in FIG. 1A.
Figure 1C:
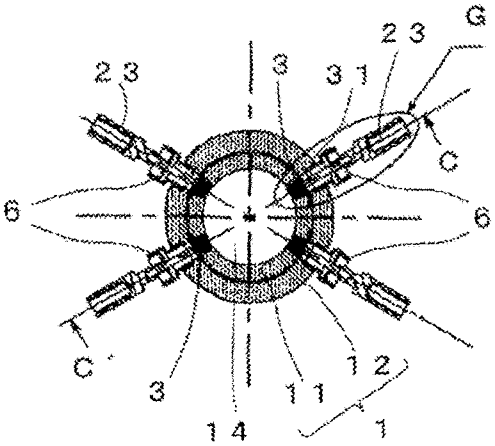
FIG. 1C is a cross-sectional view taken along line B-B' in FIG. 1A.

As illustrated in FIG. 1B, which is a cross-sectional view taken along line A-A' in FIG. 1A, and in FIG. 1C, which is a cross-sectional view taken along line B-B', the insulating member 1 includes a first insulating member 11 made of a ceramic having a tubular shape; and a second insulating member 12 made of a ceramic having a tubular shape disposed on an outer peripheral side of the first insulating member 11. A space 14 surrounded by an inner peripheral surface of the first insulating member 11 is formed inside the insulating member 1. The second insulating member 12 is positioned by mounting a sleeve 9 described below (see FIGS. 4B and 4C).

The first insulating member 11 includes a plurality of through holes 3 extending in an axial direction. Here, "axial direction" refers to a direction along a center axis of the insulating member 1 made of the ceramic having the tubular shape. Further, the second insulating member 12 includes through holes 31 that communicate with the through holes 3 of the first insulating member 11.

The insulating member 1 includes a plurality of first power feed terminals 5 and a plurality of second power feed terminals 6 on two end surfaces thereof, respectively. As illustrated in FIG. 1B, the first power feed terminals 5, 5 adjacent to each other are connected by a line 16 to form a magnetic field. Connection members 23 for feeding power are respectively connected to the second power feed terminals 6.

Figure 2:
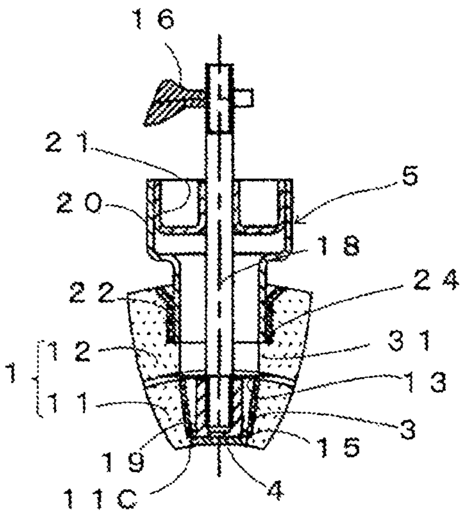
FIG. 2 is an enlarged view of a region F in FIG. 1B.
Figure 3:
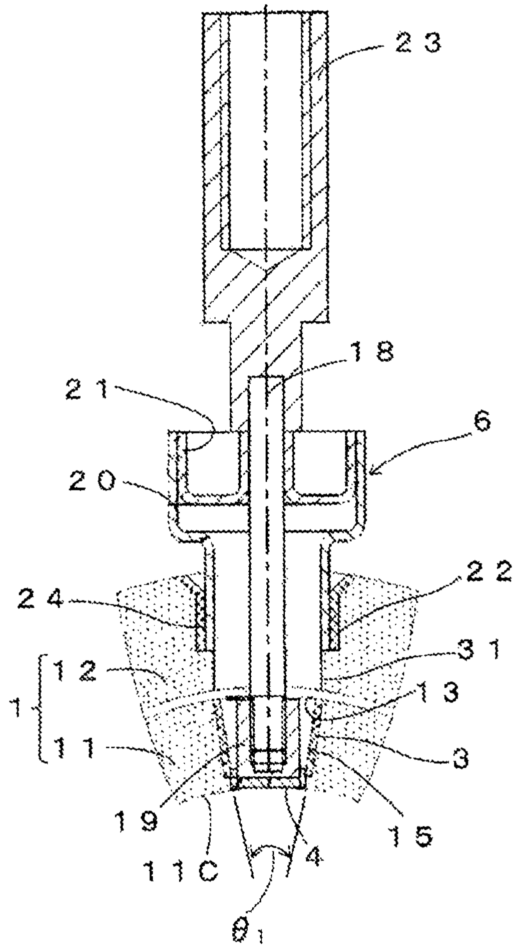
FIG. 3 is an enlarged view of a region Gin FIG. 1C.

As illustrated in FIG. 2, which is an enlarged view of the region F in FIG. 1B, and in FIG. 3, which is an enlarged view of the region G in FIG. 1C, a conductive member 4 is disposed in each of the through holes 3. The conductive member 4 is made of a metal, extends in the axial direction together with the through hole 3, and, as illustrated in FIGS. 2 and 3, seals off the through hole 3 to form an opening portion 13 that opens to an outer periphery of the first insulating member 11. The conductive member 4 sealing off the through hole 3 ensures the airtightness of the space 14 surrounded by the inner peripheral surface of the first insulating member 11 (see FIGS. 1B, 1C, and 4A).

Here, two end surfaces of the conductive member 4 in the axial direction are preferably curved surfaces that extend in the axial direction in a plan view.

In a configuration in which both end surfaces of the conductive member 4 in the axial direction have such a shape, thermal stress remaining near both end surfaces of the conductive member 4 in the axial direction can be reduced even when heating and cooling are repeated.

As illustrated in FIGS. 2 and 3, the width between inner walls of the through hole 3 may increase gradually, as in a tapered surface, from the inner peripheral side toward an outer peripheral side of the first insulating member 11. In a configuration in which the through hole 3 includes such a tapered surface, stress remaining in the first insulating member 11 is alleviated even when heating and cooling are repeated, and thus cracking in the first insulating member 11 can be suppressed over an extended period of time.

Furthermore, in a configuration in which the through hole 3 includes the tapered surface, an angle θ1 (see FIG. 3) formed by the inner walls opposed to each other may be 12° or more and 20° or less. When the angle θ1 is within this range, the mechanical strength of the insulating member 1 can be maintained, and cracking in the insulating member 1 can be further suppressed. Note that the angle θ1 formed by the inner walls opposed to each other may be measured in a cross section orthogonal to the axial direction.

Figure 4A:
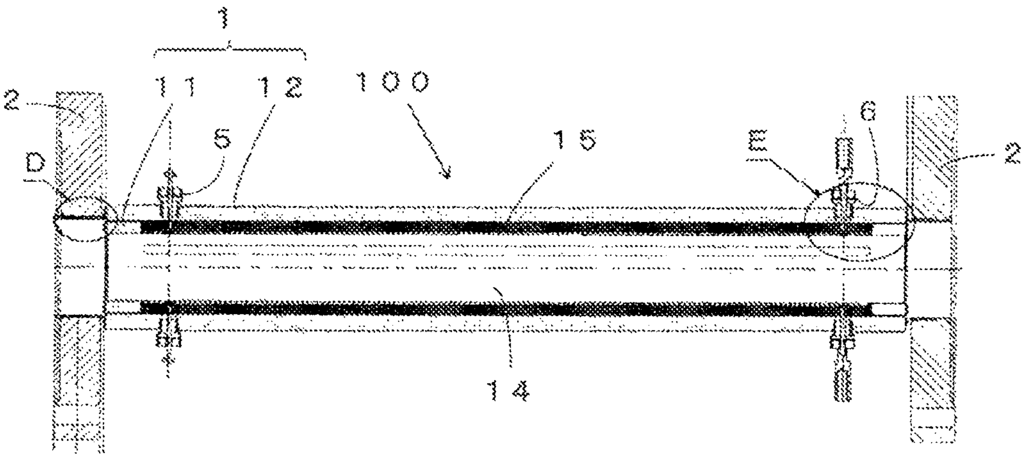
FIG. 4A is a cross-sectional view taken along line C-C' in FIG. 1C.
Figure 4B:
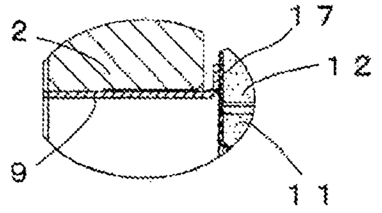
FIG. 4B is an enlarged view of a region D in FIG. 4A.
Figure 4C:
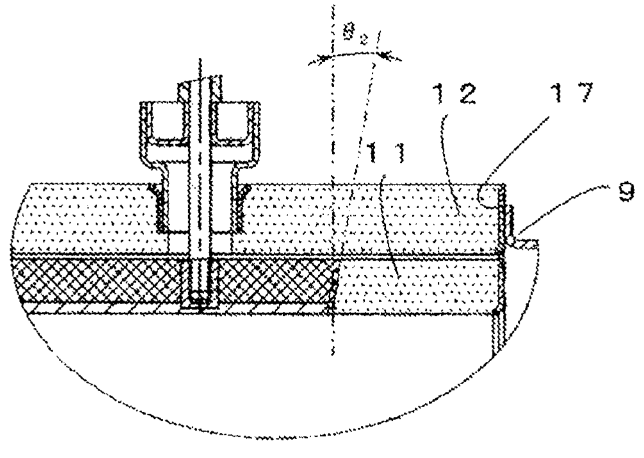
FIG. 4C is an enlarged view of a region E in FIG. 4A.

At least one of both end surfaces forming the through hole 3 may be inclined toward one of both ends in the axial direction in the cross-sectional view illustrated in FIG. 4C. An angle θ2 between a normal line n of a central axis and the end surface is, for example, 4° or more and 12° or less.

On the other hand, the width between inner walls of the through hole 31 of the second insulating member 12 is substantially constant from an inner peripheral side toward an outer peripheral side of the second insulating member 12. That is, as illustrated in FIGS. 2 and 3, a step portion 24 is provided on an outer peripheral side of the through hole 31 of the second insulating member 12, a metallization layer 22 is formed on a surface of the step portion 24, and a tip portion of a first sleeve 20, which will be described later, is inserted into the step portion 24 and fixed, thus making the width between the inner walls substantially constant. Accordingly, the airtightness of a space surrounded by an inner peripheral surface of the second insulating member 12 can be further improved. As a result, the airtightness of the electromagnetic field control member 100 can be, for example, $1.3\times10^{-11}$ Pa·m$^3$/s or less as measured by a He leak detector.

Note that, as with the through hole 3, the through hole 31 may include a tapered surface for which the width between the inner walls of the through hole 31 gradually increases.

The conductive member 4 ensures a conductive region for driving an induced current excited so as to accelerate or deflect electrons, heavy particles, and the like that move within the space 14. The conductive member 4 may include a flat surface on the inner peripheral side of the first insulating member 11, but, as illustrated in FIGS. 2 and 3, is preferably curved along an inner periphery 11*c* of the first insulating member 11.

The first power feed terminals 5 and the second power feed terminals 6 are each inserted into corresponding ones of the through holes 31 of the second insulating member 12 and connected to the conductive member 4 within the through hole 3 of the first insulating member 11, so as to provide electrical power to the conductive member 4 at or near two ends of the conductive member 4 disposed along the axial direction.

Further, as illustrated in FIGS. 2 and 3, a metallization layer 15 is formed on two inner walls of the first insulating member 11, both of the inner walls facing each other across the through hole 3. The metallization layer 15 may be positioned between the first insulating member 11 and the conductive member 4. Further, the metallization layer 15 is formed from the first power feed terminal 5 to the second power feed terminal 6 (see FIG. 4A).

The metallization layer 15 includes, for example, molybdenum as a main constituent and manganese as well. Furthermore, a surface of the metallization layer 15 may include a metal layer including nickel as a main constituent.

The thickness of the metallization layer 15 is, for example, 15 μm or more and 45 μm or less. The thickness of the metal layer is, for example, 0.01 μm or more and 0.1 μm or less.

The conductive member 4 is bonded to the first insulating member 11 by a brazing material such as a silver solder (e.g., BAg-8, BAg-8A, BAg-8B) via the metallization layer 15 or the metal layer.

As illustrated in FIG. 2, the first power feed terminal 5 includes: a pin 18 inserted into the through holes 3, 31 along a radial direction of the insulating member 1; a block 19 screw-fastened to a tip portion of the pin 18; the first sleeve 20 including a tip portion to be inserted into the second insulating member 12, the first sleeve 20 being bonded to an inner wall surface of the second insulating member 12; and a second sleeve 21 fitted within an enlarged-diameter part on a rear end of the first sleeve 20, the second sleeve 21 being bonded to the first sleeve 20.

The first sleeve 20 is bonded to the second insulating member 12 by a brazing material such as silver solder (e.g., BAg-8, BAg-8A, BAg-8B) via the metallization layer 22 formed on the inner wall surface of the second insulating member 12.

The pin 18 of the first power feed terminal 5 includes the line 16 connected to a rear end portion thereof located on the outer peripheral side of the second insulating member 12. The pin 18 and the line 16 are made of, for example, an oxygen-free copper (e.g., alloy number C1020 as specified in JIS H 3100:2012 or alloy number C1011 as specified in JIS H 3510:2012). The block 19 is screw-fastened to and securely holds the pin 18, and includes a bottom surface fixed to a surface of the conductive member 4. The conductive member 4 is interposed between the metallization layers 15 formed on both of the inner walls of the first insulating member 11 and is brazed to the first insulating member 1 via the metallization layer 15. Accordingly, the conductive member 4 is securely held.

For example, the block 19 is made of an oxygen-free copper (e.g., C1020, C1011), and the first sleeve 20 and the second sleeve 21 are both made of titanium (e.g., types 1, 2, 3, 4 as specified in JIS H4600:2012). The first sleeve 20 and the second sleeve 21 are bonded, for example, by TIG welding, which is a type of arc welding method, and the pin 18 and the second sleeve 21 are bonded by a brazing material such as a silver solder (e.g., BAg-8, BAg-8A, BAg-8B), both hermetically sealing gas that may leak from a gap of a screw portion between the block 19 and the pin 18 toward the outside. In a configuration in which both the first sleeve 20 and the second sleeve 21 are made of titanium, TIG welding is facilitated, and reliability of airtightness is improved.

The second power feed terminal 6 illustrated in FIG. 3 is identical to the first power feed terminal 5 illustrated in FIG. 2, except that, instead of the line 16, the connection member 23 is fitted to the pin 18, and thus identical reference numerals will be assigned to identical members, and descriptions thereof will be omitted.

As illustrated in FIG. 4A, the first insulating member 11 has both ends fixed to the flange 2 and is hermetically sealed. That is, the space 14 located inside the first insulating member 11 is used to accelerate or deflect electrons, heavy particles, and the like that move within the space 14 by a high-frequency or pulsed electromagnetic field, and thus is kept in a vacuum state. Note that the flange 2 is a member that connects to a vacuum pump for vacuuming the space 14.

Figure 5:
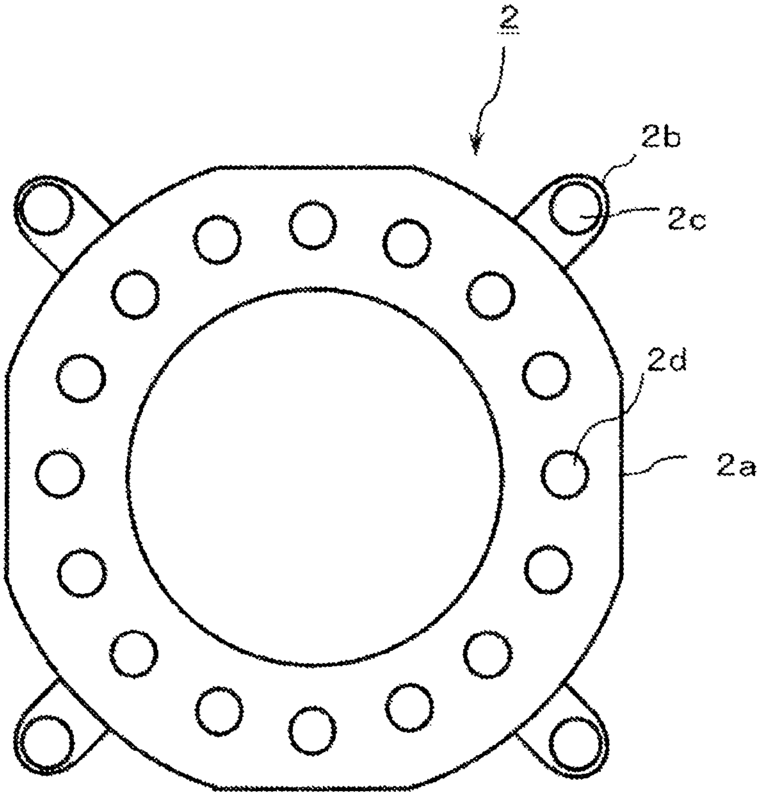
FIG. 5 is a front view illustrating a flange of FIG. 1A.

As illustrated in FIG. 5, the flange 2 includes an annular base portion 2*a* and a plurality of extending portions 2*b* extending radially from an outer peripheral surface of the annular base portion 2*a*. The extending portions 2*b* are bonded to the outer peripheral surface of the annular base portion 2*a* by TIG welding, which is a type of arc welding method, and, in the example illustrated in FIG. 5, four extending portions 2*b* are provided at equal intervals along a circumferential direction. Each of the extending portions 2*b* includes an insertion hole 2*c* including a female screw portion along a thickness direction. A shaft S including a male screw portion is inserted into the insertion hole 2*c*, and fastened by nuts (not illustrated) from both sides in the thickness direction of the extending portion 2*b*. Thus, the flanges 2, 2 respectively mounted on the two ends of the insulating member 1 are connected to each other.

The annular base portion 2*a* includes mounting holes 2*d* at equal intervals along the circumferential direction for connecting with a flange on a vacuum pump side (not illustrated), and a fastening member such as a bolt is inserted into each of the mounting holes 2*d*. Thus, the flanges are fastened to each other.

The flanges 2, the shaft S, and the nuts are preferably made of an austenitic stainless steel. An austenitic stainless steel is non-magnetic, and thus effects of magnetism caused by the flanges 2 on the electromagnetic field control member 100 can be reduced. In particular, the flanges 2 are preferably made of SUS304L and SUS304L, respectively. SUS304L and SUS304L are stainless steels that are not prone to grain boundary corrosion. Thus, in a configuration in which the extending portion 2*b* is TIG welded to the outer peripheral surface of the annular base portion 2*a*, and when the annular base portion 2*a* and the extending portion 2*b* are at a high temperature, grain boundary corrosion is unlikely to occur, and the airtightness of the annular base portion 2*a* is unlikely to be impaired. TIG welding of the extending portion 2*b* to the outer peripheral surface of the annular base portion 2*a* may be intermittent welding or continuous welding along the thickness direction.

The second insulating member 12 is fixed to the flange 2 by a first sealing means to be hermetically sealed. As illustrated in FIGS. 4B and 4C, in which the region D and the region E in FIG. 4 are enlarged, respectively, the first sealing means includes a bonding portion formed on an end surface of the second insulating member 12 and the sleeve 9 bonded to the bonding portion. The bonding portion is made of, for example, a metallization layer 17 formed on the end surface of the second insulating member 12 and a brazing material that bonds the metallization layer 17 and the sleeve 9. A tip of the sleeve 9 is bent so as to contact the end surface of the second insulating member 12. Examples of the brazing material include silver solder (e.g., BAg-8, BAg-8A, BAg-8B).

Additionally, the sleeve 9 is bonded to an inner peripheral surface of the flange 2 using TIG welding so as to be hermetically sealed.

The first and second power feed terminals 5, 6 are hermetically bonded and fixed to the inner walls of the through hole 31 formed in the second insulating member 12 by a second sealing means. Examples of the second sealing means include, as illustrated in FIGS. 2 and 3, a means of bonding, by using a brazen material, the metallization layer 22 formed on an inner wall surface of the through hole 31 and the first sleeve 20 made of a metal.

Through the first sealing means, the second sealing means, and the TIG welding of the sleeve 9 and the flange 2, as described above, the airtightness of the electromagnetic field control member 100 can be, for example, $1.3\times10^{-11}$ Pa $m^3/s$ or less as measured by a helium leak detector.

An outer peripheral side of each of end portions of the first insulating member 11 may include a flat surface on an extension line in the axial direction of the through hole 3.

The flat surface can partially widen a gap between the first insulating member 11 and the second insulating member 12 at each of the end portions, and thus can facilitate exhaust from the gap between the first insulating member 11 and the second insulating member 12.

An outer peripheral side of each of end portions of the second insulating member 12 may include a flat surface on an extension line in the axial direction of the through hole 31.

The flat surface allows the first power feed terminals 5 and the second power feed terminals 6 each to be mounted on a corresponding one of the conductive members 4 without the second insulating member 12 rolling, thus facilitating the mounting process.

An example of the flat surface is a D cut surface, which is a surface in which an outer peripheral surface on the extension line in the axial direction of the through hole 3 or 31 has been removed.

The first insulating member 11 has electrical insulation and non-magnetic properties, examples of which include a ceramic having aluminum oxide as a main constituent and a ceramic having zirconium oxide as a main constituent, a ceramic having aluminum oxide as a main constituent being particularly preferable. The average particle size of aluminum oxide crystals is preferably 5 μm or more and 20 μm or less.

When the average particle size of the aluminum oxide crystals is within the range described above, a surface area of a grain boundary phase per unit surface area decreases compared with when the average particle size is less than 5 μm, and thus thermal conductivity improves. On the other hand, the surface area of the grain boundary phase per unit surface area increases, compared with when the average particle size exceeds 20 μm, and the adhesiveness of the metallization layer 15 increases due to the anchor effect of the metallization layer 15 in the grain boundary phase, such that reliability improves and mechanical properties increase.

To measure the particle size of the aluminum oxide crystals, a first polishing step is performed on a copper grinder from a surface of the first insulating member 11 in a depth direction using diamond abrasive particles having an average particle size $D_{50}$ of 3 μm. Thereafter, a second polishing step is performed on a tin grinder using diamond abrasive particles having an average particle size $D_{50}$ of 0.5 μm. The depth of polishing including the first polishing step and the second polishing step is, for example, 0.6 mm. A polished surface obtained by the polishing steps is subjected to thermal treatment at 1480° C. until crystal particles and a grain boundary layer are distinguishable, and an observation surface is obtained. The thermal treatment is performed for approximately 30 minutes, for example.

A thermally treated surface is observed under an optical microscope and photographed, for example, at a magnification factor of 400×. In a captured image, a surface area of $4.8747 \times 10^2$ μm is used as a measuring range. By analyzing the measuring range using image analysis software (e.g., Win ROOF, manufactured by Mitsubishi Corporation), particle sizes of individual crystals can be obtained, and an average particle size of the crystals is an arithmetic average of the particle sizes of the individual crystals.

Here, the kurtosis of the particle size distribution of the aluminum oxide crystals is preferably 0 or more. Accordingly, variations in the particle sizes of the crystals are suppressed and thus localized reduction in mechanical strength is less likely to occur. In particular, the kurtosis of the particle size distribution of the aluminum oxide crystals is preferably 0.1 or more.

"Kurtosis" generally refers to a statistical amount that indicates a degree to which a distribution deviates from the normal distribution, indicating the sharpness of the peak and the spread of the tail. When the kurtosis is less than 0, the peak is gentle and the tail is short. When the kurtosis is larger than 0, the peak is sharp and the tail is long. The kurtosis of a normal distribution is 0.

The kurtosis can be determined by the function Kurt provided in Excel (Microsoft Corporation), using the particle sizes of the crystals described above. To make the kurtosis 0 or more, for example, the kurtosis of the particle size distribution of aluminum oxide powder, which is a raw material, may be set to 0 or more.

Here, "ceramic having aluminum oxide as a main constituent" refers to a ceramic having an aluminum oxide content, with Al converted to $Al_2O_3$, of 90% by mass or more, with respect to all the constituents constituting the ceramic being 100% by mass. Constituents other than the main constituent may include, for example, at least one of silicon oxide, calcium oxide, or magnesium oxide.

Here, "ceramic having zirconium oxide as a main constituent" refers to a ceramic having a zirconium oxide content, with Zr converted to $ZrO_2$, of 90% by mass or more, with respect to all the constituents constituting the ceramic being 100% by mass. Examples of the constituents other than the main constituent may include yttrium oxide.

Here, the constituents constituting the ceramic can be identified from measurement results by an X-ray diffractometer using a CuKα beam, and the content of each of the components can be determined, for example, with an inductively coupled plasma (ICP) emission spectrophotometer or a fluorescence X-ray spectrometer.

The second insulating member 12, in the same manner as the first insulating member 11, has electrical insulation and non-magnetic properties, includes, for example, a ceramic having aluminum oxide as the main constituent or a ceramic having zirconium oxide as the main constituent, and preferably includes a ceramic having aluminum oxide as the main constituent, in particular. Preferably, in the same manner as the first insulating member 11, the average particle size of the aluminum oxide crystals is 5 μm or more and 20 μm or less, and the kurtosis of the particle size distribution of the aluminum oxide crystals is 0 or more.

Dimensions of the first insulating member 11 are set to, for example, an outer diameter of 35 mm or more and 45 mm or less, an inner diameter of 25 mm or more and 35 mm or less, and a length in an axial direction of 350 mm or more and 370 mm or less.

Dimensions of the second insulating member 12 are set to, for example, an outer diameter of 50 mm or more and 60 mm or less, an inner diameter of 36 mm or more and 46 mm or less, and the length in the axial direction is substantially the same as that of the first insulating member 11.

When obtaining the first insulating member 11 and the second insulating member 12 that are each made of a ceramic having aluminum oxide as the main constituent, an aluminum oxide powder, which is the main constituent, a magnesium hydroxide powder, a silicon oxide powder, a calcium carbonate powder, and, as necessary, a dispersing agent that disperses an alumina powder are ground and mixed in a ball mill, a bead mill, or a vibration mill to form a slurry, and the slurry, after a binder has been added and mixed therewith, is spray dried to form granules having alumina as the main constituent.

To make the kurtosis of the particle size distribution of the aluminum oxide crystals 0 or more, the time for grinding and mixing is adjusted so that the kurtosis of the particle size distribution of the powders is 0 or more.

Here, the average particle size ($D_{50}$) of the aluminum oxide powder is 1.6 μm or more and 2.0 μm or less, and of a total of 100% by mass of the powder, the content of the magnesium hydroxide powder is 0.43 to 0.53% by mass, the content of the silicon oxide powder is 0.039 to 0.041% by mass, and the content of the calcium carbonate powder is 0.020 to 0.022% by mass.

Next, the granules obtained by the method described above are filled into a molding die and a powder compact is obtained using an isostatic press method (rubber press method) or the like with a molding pressure of, for example, 98 MPa or more and 147 Mpa or less.

After molding, pilot holes having a long shape that serve as the plurality of through holes 3 along the axial direction of the first insulating member 11, pilot holes having a cylindrical shape that serve as the through holes 31 into which the power feed terminals 6 of the second insulating member 12 are inserted, and pilot holes that open end surfaces on both sides along the axial direction of the first insulating member 11 and the second insulating member 12 are formed by cut processing, each of the insulating members being a powder compact having a cylindrical shape.

As necessary, the powder compact formed by cut processing is heated for 10 to 40 hours in a nitrogen atmosphere, is held for 2 to 10 hours at 450° C. to 650° C., and then, with the binder disappearing by natural cooling, turns into a degreased body.

Then, by firing the powder compact (degreased body) in an air atmosphere at a firing temperature of 1500° C. or more and 1800° C. or less and holding the firing temperature for 4 hours or more and 6 hours or less, the first insulating member 11 and the second insulating member 12, which are each made of a ceramic having aluminum oxide as the main constituent and having an average particle size of aluminum oxide crystals of 5 μm or more and 20 μm or less, can be obtained.

The electromagnetic field control member according to an embodiment of the present disclosure includes the second insulating member 12, which has a tubular shape, on the outer peripheral side of the first insulating member 11 having the tubular shape, the second insulating member 12 including two ends that are respectively hermetically bonded to the flanges 2, and thus the airtightness at both end portions of the insulating member 1 increases, and the overall airtightness of the electromagnetic field control member 100 can improve.

The electromagnetic field control member according to an embodiment of the present disclosure has been described above, but the present disclosure is not limited to the embodiment, and various changes and modifications can be made. For example, direct brazing can be performed instead of using the metallization layer, as necessary.

REFERENCE SIGNS LIST

1 Insulating member
11 First insulating member
12 Second insulating member
2 Flange
3, 31 Through hole
4 Conductive member
5 First power feed terminal
6 Second power feed terminal
9 Sleeve
13 Opening portion
14 Space
15, 17, 22 Metallization layer
16 Line
18 Pin
19 Block
20 First sleeve
21 Second sleeve
23 Connection member
24 Step portion
100 Electromagnetic field control member

The invention claimed is:

1. An electromagnetic field control member comprising:

a first insulating member made of a ceramic having a tubular shape, the first insulating member comprising a plurality of through holes extending in an axial direction of the first insulating member;

a plurality of conductive members made of a metal, each conductive member sealing off one through hole of the plurality of through holes and leaving an opening portion in the each through hole, the opening portion opening to an outer periphery of the first insulating member;

a plurality of power feed terminals, each power feed terminal connected to one of the plurality of conductive members;

two flanges respectively located at two ends of the first insulating member, and a second insulating member made of a ceramic having a tubular shape and located on an outer peripheral side of the first insulating member, the second insulating member comprising two ends that are hermetically fixed to the two flanges, respectively.

2. The electromagnetic field control member according to claim 1, wherein the second insulating member comprises end portions, each end portion of the end portions is fixed to a corresponding flange of the two flanges via a sleeve, the sleeve corresponding to the each end portion of the end portions is hermetically fixed to an inner peripheral surface of the corresponding flange, a tip portion of the sleeve extending from the inner peripheral surface of the corresponding flange toward the second insulating member is bent, and a surface of the tip portion that is bent contacts an end surface of the second insulating member and is hermetically fixed.

3. The electromagnetic field control member according to claim 2, wherein a metallization layer is formed on the end surface of the second insulating member, and the metallization layer and the tip portion of the sleeve are joined by a brazing material.

4. The electromagnetic field control member according to claim 1, wherein the second insulating member comprises a through hole in which the power feed terminal is inserted, and the power feed terminal is hermetically fixed to an inner wall of the through hole.

5. The electromagnetic field control member according to claim 4, wherein the power feed terminal comprises a sleeve, the sleeve of the power feed terminal comprises a tip portion, and the tip portion of the sleeve is inserted into the through hole of the second insulating member, and a metallization layer formed on an inner wall surface of the through hole and the sleeve of the power feed terminal are bonded by a brazing material.

6. The electromagnetic field control member according to claim 1, wherein two end surfaces of the conductive member are curved surfaces extending in the axial direction in a plan view.

7. The electromagnetic field control member according to claim 1, wherein an outer peripheral side of each end portion of two end portions of the first insulating member comprises a flat surface on an extension line in an axial direction of the through hole of the first insulating member.

8. The electromagnetic field control member according to claim 1, wherein an outer peripheral side of each end portion of two end portions of the second insulating member comprises a flat surface on an extension line in the axial direction of the through hole of the second insulating member.

9. The electromagnetic field control member according to claim 1, wherein the ceramic of the first insulating member includes aluminum oxide as a main constituent, and an average particle size of aluminum oxide crystals of the aluminum oxide is 5 μm or more and 20 μm or less.

10. The electromagnetic field control member according to claim 9, wherein a kurtosis of particle size distribution of the aluminum oxide crystals is 0 or more.

11. The electromagnetic field control member according to claim 1, wherein the ceramic of the second insulating member includes aluminum oxide as a main constituent, and an average particle size of aluminum oxide crystals of the aluminum oxide is 5 μm or more and 20 μm or less.

12. The electromagnetic field control member according to claim 11, wherein a kurtosis of particle size distribution of the aluminum oxide crystals is 0 or more.

13. An electromagnetic field control member comprising:

a first insulating member made of a ceramic having a tubular shape, the first insulating member comprising a plurality of through holes positioned between a first end of the first insulating member and a second end of the first insulating member;

a first flange located at the first end of the first insulating member;

a second flange located at the second end of the first insulating member;

a conductive member made of a metal, the conductive member sealing off each through hole of the plurality of through holes and leaving an opening portion in each through hole, the opening portion opening to an outer periphery of the first insulating member;

a power feed terminal connected to the conductive member;

a second insulating member made of a ceramic having a tubular shape and located on an outer peripheral side of the first insulating member, the second insulating member comprising a first end that is hermetically fixed to the first flange and a second end that is hermetically fixed to the second flange.

14. The electromagnetic field control member of claim 13, wherein the plurality of through holes are connected in an axial direction through the first insulating member.

* * * * *